(12) United States Patent
Le (10) Patent No.: US 10,788,417 B2
(45) Date of Patent: Sep. 29, 2020

(54) METHOD FOR ESTIMATING THE INTENSITY OF A WAVE EMITTED BY AN EMITTING SOURCE

(71) Applicant: Elichens, Grenoble (FR)

(72) Inventor: Thanh Trung Le, Grenoble (FR)

(73) Assignee: Elichens, Grenoble (FR)

( * ) Notice: Subject to any disclaimer, the term of this patent is extended or adjusted under 35 U.S.C. 154(b) by 0 days.

(21) Appl. No.: 16/485,744

(22) PCT Filed: Feb. 13, 2018

(86) PCT No.: PCT/EP2018/053483
§ 371 (c)(1),
(2) Date: Aug. 13, 2019

(87) PCT Pub. No.: WO2018/149799
PCT Pub. Date: Aug. 23, 2018

(65) Prior Publication Data
US 2020/0003680 A1    Jan. 2, 2020

(30) Foreign Application Priority Data

Feb. 14, 2017   (FR) ..................................... 17 51202

(51) Int. Cl.
*G01N 21/27*     (2006.01)
*G01N 21/51*     (2006.01)
(Continued)

(52) U.S. Cl.
CPC .......... *G01N 21/274* (2013.01); *G01N 21/51* (2013.01); *G01N 21/61* (2013.01); *G01N 21/33* (2013.01);
(Continued)

(58) Field of Classification Search
CPC ...... G01N 21/274; G01N 21/51; G01N 21/61; G01N 21/33; G01N 21/3504; G01N 2201/06106
(Continued)

(56) References Cited

U.S. PATENT DOCUMENTS 5,502,308 A * 3/1996 Wong .................... G01N 21/031
250/338.5
7,704,301 B2 * 4/2010 Zhou .................. G01N 21/3504
423/210
(Continued)

FOREIGN PATENT DOCUMENTS

| EP | 0729727 A2 | 9/1996 |
|----|------------|--------|
| FR | 2931555 A1 | 11/2009 |
| FR | 3022633 A1 | 12/2015 |

OTHER PUBLICATIONS

Riris et al., Kalman Filtering of Tunable Diode Laser Spectrometer Absorbance Measurements, Applied Optics, Optical Socitey of America, vol. 33 No. 24, Aug. 20, 1994, pp. 5506-5508.
(Continued)

*Primary Examiner* — Roy M Punnoose
(74) *Attorney, Agent, or Firm* — TraskBritt (57) ABSTRACT

A method for analyzing a gaseous sample, by comparing an incident light wave and a transmitted light wave, the method comprising: i) illuminating the sample with a light source emitting the incident light wave propagating up to the sample; ii) detecting a light wave transmitted by the sample; iii) detecting a reference light wave emitted by the light source and representing a light wave reaching a reference photodetector without interacting with the sample; iv) repeating i) to iii) at different measurement instants; v) estimating, at each measurement instant, an intensity of the reference light wave; vi) taking into account the estimated intensity of the reference light wave and the detected inten-
(Continued)

sity of the transmitted light wave to perform a comparison, at each measurement instant; and vii) analyzing the gaseous sample as a function of the comparison.

13 Claims, 4 Drawing Sheets

(51) Int. Cl.
*G01N 21/61* (2006.01)
*G01N 21/33* (2006.01)
*G01N 21/3504* (2014.01)

(52) U.S. Cl.
CPC .............. *G01N 21/3504* (2013.01); *G01N 2201/06106* (2013.01)

(58) Field of Classification Search
USPC ........................................... 356/433
See application file for complete search history.

(56) References Cited

U.S. PATENT DOCUMENTS

| | | | | |
|---|---|---|---|---|
| 8,152,900 | B2* | 4/2012 | Zhou | G01N 21/3504 |
| | | | | 423/210 |
| 8,358,417 | B2* | 1/2013 | Feitisch | G01N 21/031 |
| | | | | 356/440 |
| 8,500,849 | B2* | 8/2013 | Zhou | G01N 21/3504 |
| | | | | 423/210 |
| 8,953,165 | B2* | 2/2015 | Feitisch | G01J 3/42 |
| | | | | 356/437 |
| 9,696,204 | B2* | 7/2017 | Liu | G01J 3/28 |
| 2003/0134427 | A1* | 7/2003 | Roller | G01N 33/497 |
| | | | | 436/171 |
| 2007/0246653 | A1* | 10/2007 | Zhou | G01N 21/39 |
| | | | | 250/339.1 |
| 2008/0304066 | A1* | 12/2008 | Kluczynski | G01N 21/39 |
| | | | | 356/437 |
| 2010/0091278 | A1 | 4/2010 | Liu et al. | |
| 2011/0235042 | A1* | 9/2011 | Martin | G01N 21/0303 |
| | | | | 356/437 |
| 2011/0299084 | A1* | 12/2011 | Feitisch | G01N 21/39 |
| | | | | 356/433 |
| 2019/0265158 | A1* | 8/2019 | Caritu | G01J 3/42 |

OTHER PUBLICATIONS

Leleux D P et al., Applications of Kalman filtering to real-time trace gas concentration measurements, Applied Physics B: Lasers and Optics, Springer International, vol. 74 No. 1, Nov. 29, 2001, pp. 85-93.

International Search Report for International Application PCT/EP2018/053483, dated May 30, 2018, 9 pages (including English translation).

International Written Opinion for International Application PCT/EP2018/053483, dated May 30, 2018, 10 pages.

* cited by examiner

METHOD FOR ESTIMATING THE INTENSITY OF A WAVE EMITTED BY AN EMITTING SOURCE

CROSS-REFERENCE TO RELATED APPLICATIONS

This application is a national phase entry under 35 U.S.C. § 371 of International Patent Application PCT/EP2018/053483, filed Feb. 13, 2018, designating the United States of America and published as International Patent Publication WO 2018/149799 A1 on Aug. 23, 2018, which claims the benefit under Article 8 of the Patent Cooperation Treaty to French Patent Application Serial No. 1751202, filed Feb. 14, 2017.

TECHNICAL FIELD

The technical field of the disclosure is the use of a light source, in particular a black body or grey body, to perform optical measurements, with a temporal drift affecting the light radiation emitted by the light source taken into account.

BACKGROUND

Optical methods are quite frequently used to analyze gas or to count particles. Some devices allow the composition of a gas to be determined based on the fact that the species from which a gas is composed have spectral absorption properties that differ from one another. Thus, if the spectral absorption band of a gaseous species is known, its concentration may be determined by estimating the absorption of light passing through the gas, using the Beer-Lambert law. This principle allows the concentration of a gaseous species present in a medium to be estimated.

The light source is usually a source that emits in the infrared, the employed method usually being referred to as NDIR detection, the acronym NDIR meaning non-dispersive infrared. Such a principle has frequently been implemented, and is, for example, described in many documents, for example, in U.S. Pat. No. 5,026,992 or WO2007064370.

In the most common methods, the analyzed gas lies between a light source and a photodetector, called the measurement photodetector, the latter being intended to measure a light wave transmitted by the gas to be analyzed, and partially absorbed by the latter. These methods generally comprise measuring a light wave, called the reference light wave, emitted by the source, and not absorbed by the analyzed gas.

Comparison of the transmitted light wave and the reference light wave allows the gas to be characterized. It is, for example, a question of determining an amount of a gaseous species in the gas, using the technology referred to as "NDIR absorption". It may also be a question of estimating an amount of particles in the gas, by detecting light scattered by the latter in a preset angular range of scatter.

The reference light wave is measured by a reference photodetector. It may be a question of a reference photodetector different from the measurement photodetector, and arranged so as to be placed facing the light source, in such a way that the gas to be analyzed cannot get between the reference photodetector and the measurement photodetector. Alternatively, the reference photodetector is placed beside the measurement photodetector, and is associated with a reference optical filter. The reference optical filter defines a reference spectral band, in which the gas to be analyzed has no significant absorption. The reference photodetector and the measurement photodetector may be merged, to form a single photodetector. In this case, the device comprises a means for adjusting the filter associated with the photodetector, such that the photodetector is associated with the reference filter in order to measure the reference light wave.

In other methods, rather than an amount of a gaseous species in a gas, an amount of particles in the gas is determined, from radiation transmitted or scattered by the gas. In this case, a photodetector detects the radiation transmitted or scattered by the gas, whereas a reference photodetector measures the radiation emitted by the light source. A comparison of the radiation detected by the measurement photodetector and the radiation detected by the reference photodetector allows an amount of particles present in the gas to be estimated.

A number of documents describe devices intended to determine a measurement of the concentration of a gas, with application of a Kalman filter applied to signals measured by measurement photodetectors, or to amounts of gas estimated from such signals. For example, document EP0729727 describes a $CO_2$ detector comprising a measurement photodetector. The signal detected by the measurement photodetector is processed by a Kalman filter. The publication Leleux "Applications of Kalman filtering to real-time trace gas concentration measurements", Appl. Phys. B 74, 85-93 (2002) describes an application of a Kalman filter to measured concentrations of gas. The publication Riris H "Kalman filtering of tunable diode laser spectrometer absorbance measurements" Appl. Optics, Vol. 33 No 24, 20 Aug. 1994, describes an application of a Kalman filter applied to a quantity formed by an amount of gas multiplied by a distance travelled by a laser beam in the gas.

The inventors have proposed an improvement to existing devices or methods. Specifically, the reference photodetector is affected by noise, which has an impact on the estimation of the intensity of the reference wave. This is notably the case when the reference photodetector is a simple and inexpensive photodetector. Such noise may lead to uncertainty in the estimated amounts. The disclosure aims to decrease this uncertainty, by limiting the effect of fluctuations affecting the measurements carried out by the reference photodetector.

BRIEF SUMMARY

A first subject of the disclosure is a method for analyzing a gas sample, by comparison between a light wave incident on the sample and a light wave transmitted by the sample, the method comprising the following steps:

i) illuminating the sample, with a light source, the light source emitting the incident light wave, which propagates to the sample;

ii) detecting, with a photodetector called the measurement photodetector, a light wave transmitted by the sample, the transmitted light wave resulting from an interaction of the incident light wave with the sample;

iii) detecting a light wave called the reference light wave with a reference photodetector, the reference light wave being emitted by the light source, the reference light wave being representative of a light wave reaching the reference photodetector without interaction with the sample;

iv) reiterating steps i) to iii) at various times, called measurement times;

v) from each reference light wave detected in the various steps iii), at each measurement time, estimating an intensity of the reference light wave at the measurement times, by implementing the following sub steps:

b) estimating the intensity of the reference light wave at a measurement time, depending on an initial intensity or an estimation of the intensity of the reference light wave at a prior measurement time;

c) measuring the intensity of the reference light wave detected at the measurement time;

d) updating the estimation of the intensity of the wave at the measurement time, depending on the intensity measured in substep c) and the intensity estimated in substep b); and e) reiterating steps b) to d), on the basis of the estimation of the intensity obtained in substep d), while incrementing the measurement time;

vi) taking into account the intensity of the reference light wave estimated, at each measurement time, i.e., the estimated intensity resulting from step v), and an intensity of the transmitted light wave detected in step ii) in order to perform a comparison, at each measurement time, between the reference light wave (or the incident light wave) and the light wave transmitted by the sample; and vii) analyzing the gas sample depending on the comparison performed in step vi).

By sample, what is meant is a gas, liquid or solid sample that it is desired to analyze following the comparison. The transmitted light wave may notably result from scatter or absorption or diffraction or a fraction of the incident light waves by the sample.

The reference light wave is representative of a light wave emitted by the light source and that reaches the reference photodetector without interaction with the sample, or without significant interaction with the sample. It may be considered to be representative of the incident light wave.

Step v) may comprise a substep a) of determining an initial intensity of the reference light wave. Sub step a) may comprise detecting, with the sensor, the wave emitted by the emitting source during an initialization period. Substep a) may comprise the following phases:

ai) detecting the wave emitted by the emitting source at a plurality of times called preliminary times, during the initialization period, and measuring the intensity of the wave detected at each preliminary time; and aii) determining the initial intensity from a mean or a median of the intensities measured in phase ai).

Sub step b) may comprise estimating a state vector, at each measurement time, the state vector comprising an estimation of the intensity of the wave detected at the measurement time. The state vector may also comprise a term representing an estimation of the drift in the light intensity between two successive measurement times. Substep b) may then comprise estimating the state vector at each measurement time, by applying a prediction matrix to the state vector determined at a time preceding the measurement time or to an initial state vector. The method may comprise determining an initial state vector.

Substep d) may comprise the following phases:

di) performing a comparison between the measurement of the intensity carried out in sub step c) preceding substep d) and the estimation made in substep b) preceding substep d); and dii) updating the state vector depending on the comparison.

Sub steps b) to d) are preferably implemented using a recursive estimator, of the Kalman-filter type.

The sample may be able to attenuate one portion of the incident light wave, in which case the method comprises, in step vi), calculating a ratio between the estimated intensity of the reference light wave and the intensity of the transmitted light wave. Such a ratio may notably correspond to an attenuation of the incident light wave by the sample.

The sample may comprise a gaseous species able to attenuate one portion of the incident light wave, the method comprising, in step vii), estimating an amount of gaseous species in the sample, at each measurement time, from the ratio determined in step vi) at the measurement time.

A second subject of the disclosure is a device for analyzing a gas sample, the device comprising:

a light source able to emit an incident light wave that propagates toward the sample;

a measurement photodetector, able to detect a light wave transmitted by the sample, at various measurement times, the transmitted light wave resulting from an interaction of the incident light wave with the sample;

a reference photodetector, configured to detect a reference light wave representative of the incident light wave, at various measurement times;

a first processor, for estimating an intensity of the reference light wave at the various measurement times, from the reference light wave detected by the reference photodetector at the measurement times, the first processor being configured to implement step v) of the first subject of the disclosure; and a second processor for comparing, at each measurement time, the reference light wave and the light wave transmitted by the sample, at the various measurement times, from the intensity of the reference light wave estimated by the first processor at each measurement time, and from the intensity of the transmitted light wave detected by the measurement photodetector, the second processor being programmed to implement step vi) of the first subject of the disclosure.

The transmitted wave may notably result from absorption, attenuation or scatter or refraction of the incident light wave in the sample.

Other advantages and features will become more clearly apparent from the following description of particular embodiments of the disclosure, which other advantages and features are given by way of non-limiting example, and shown in the figures listed below.

DETAILED DESCRIPTION

Figure 1A:
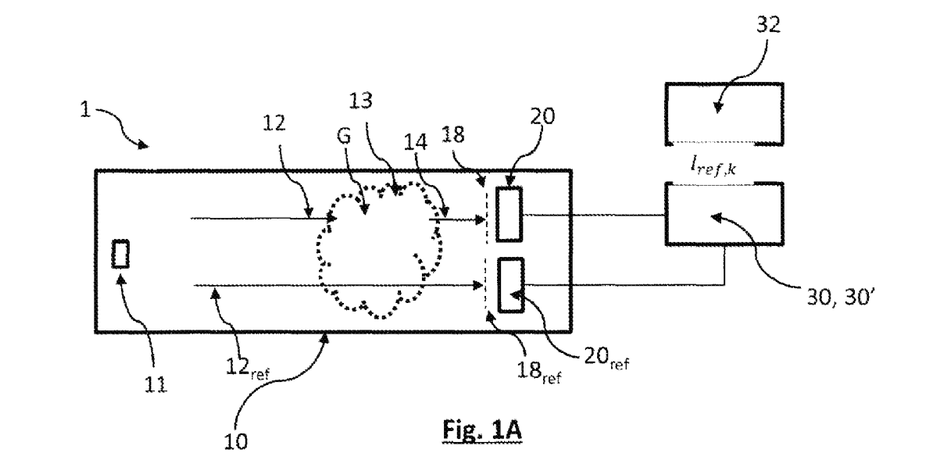
FIG. 1A shows a device allowing the disclosure to be implemented.

FIG. 1A is an example of a device 1 for analyzing gas. This device comprises an enclosure 10 defining an internal space inside of which the following are found:
- a light source 11, able to emit a light wave, called "the incident light wave 12," so as to illuminate a gas G lying in the internal space, the gas forming a sample 13; and
- a photodetector, called the "measurement photodetector 20," able to detect a light wave 14 transmitted by the sample 13, under the effect of illumination of the latter by the incident light wave 12.

The gas G may be a gas mixture comprising a plurality of gaseous species $G_1 \ldots G_S \ldots G_S$, S being a positive integer quantifying the number of different gaseous species present in the gas G.

Figure 1B:
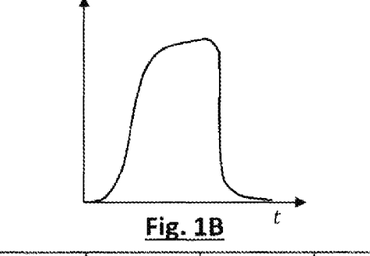
FIG. 1B illustrates the temporal form of a light pulse produced by the light source of the device.

The light source 11 is able to emit the incident light wave 12, in an illumination spectral band Δ, the latter possibly extending between the near ultraviolet and the mid infrared, i.e., between 200 nm and 10 μm, and most often between 1 μm and 10 μm. The light source 11 may notably be a pulsed source, the incident light wave 12 being a pulse of duration generally comprised between 100 ms and 1 s, such as shown in FIG. 1B. The light source may notably be a suspended filament heated to a temperature comprised between 400° C. and 800° C.

In the example in question, the photodetector is a thermopile, able to deliver a signal dependent on the intensity of the light wave to which the photodetector is exposed. It may also be a question of a photodiode or another type of photodetector.

The device may comprise a bandpass filter 18, the spectral band of which corresponds to a spectral band of a gaseous species $G_S$ for which it is desired to determine an amount $C_{s,k}$ in the gas mixture, at a measurement time k. The intensity $I_k$ of the light wave 14 detected by the measurement photodetector 20, at the measurement time k depends on the amount $C_{s,k}$, according to the Beer-Lambert equation:

$$att_k = \frac{I_k}{I_{0,k}} = e^{-\mu(C_{s,k})l} \quad (1)$$

where:
$\mu(C_{s,k})$ is an attenuation coefficient, dependent on the sought-after amount $C_{s,k}$;
l is the thickness of gas passed through by the incident light wave 12; and
$I_{0,k}$ is the intensity of the incident light wave 12 at the measurement time k.

The comparison between $I_k$ and $I_{0,k}$, which takes the form of a ratio $$\frac{I_k}{I_{0,k}},$$

corresponds to an attenuation $att_k$ of the incident light wave 12 by the sample 13 at the measurement time k.

During each pulse of the light source 11, it is thus possible to determine $\mu(C_{s,k})$, this allowing $C_{s,k}$ to be estimated, given that the relationship between $C_{s,k}$ and $\mu(C_{s,k})$ is known.

Equation (1) assumes the intensity $I_{0,k}$ of the incident light wave 12 is known at the measurement time k. To this end, the device comprises a reference photodetector $20_{ref}$, arranged such that it detects a light wave, called the reference light wave $12_{ref}$, representative of the incident light wave 12. The reference light wave reaches the reference photodetector without interacting with the sample 13, or without significantly interacting with the latter. The intensity of the reference light wave $12_{ref}$, detected by the reference photodetector $20_{ref}$ at the measurement time k, is referred to as the reference intensity $I_{ref,k}$.

In this example, the reference photodetector $20_{ref}$ is placed beside the measurement photodetector 20. It is associated with an optical filter, called the reference optical filter $18_{ref}$. The reference optical filter $18_{ref}$ defines a passband corresponding to a range of wavelengths not absorbed by the sample. The reference passband is, for example, centered on the wavelength 3.91 nm. The various configurations described with reference to the prior art may also be employed, in particular, the variants in which:
- the reference photodetector $20_{ref}$ is placed in an enclosure isolated from the gas to be analyzed; and
- the reference photodetector $20_{ref}$ and the measurement photodetector 20 are merged into one, a filter-adjusting means allowing the photodetector to be alternatively associated with the bandpass filter 18 and with the reference optical filter $18_{ref}$. It may, for example, be a question of a filter wheel.

In the prior-art devices, the measurement of $I_{ref,k}$ allows equation (1) to be used with $I_{0,k}$ replaced by $I_{ref,k}$, this allowing $\mu(C_{s,k})$ to be determined, then $\hat{C}_{s,k}$ to be estimated.

The device comprises a first processor 30, for example a microprocessor or a microcontroller. The latter is configured to receive a signal representative of an intensity $I_{ref,k}$ of the reference light wave $12_{ref}$, measured by the reference photodetector $20_{ref}$ at each measurement time k, and to implement a method in order to estimate the intensity of the reference light wave, such as described below, with reference to FIGS. 2A and 2B. The first processor 30 is connected to a memory 32 containing instructions allowing certain steps of this method to be implemented.

The device also comprises a second processor 30' configured to receive a signal representative of an intensity $I_k$ of the light wave 14 transmitted by the sample 13, this intensity being measured by the measurement photodetector 20. The second processor is programmed to determine, at each measurement time, a quantity representative of the attenuation $att_k$ of the incident light wave 12 by the sample 13. The first processor 30 and the second processor 30' may be one and the same.

Figure 1C:
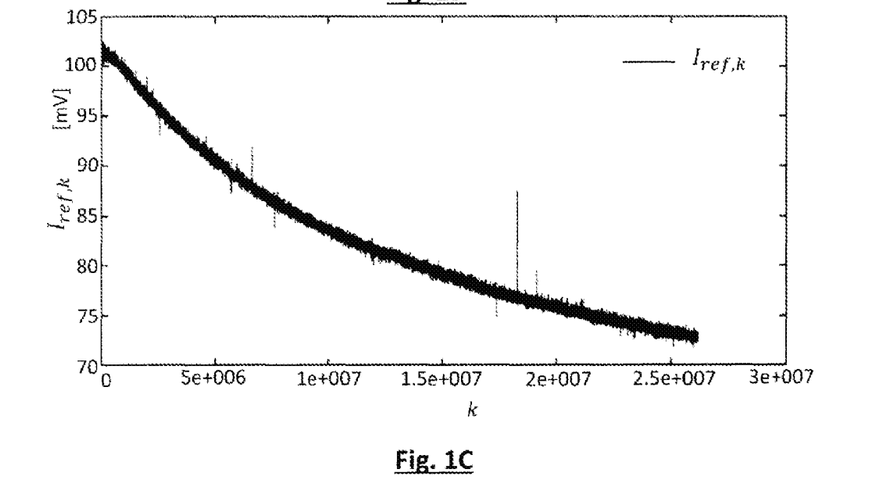
FIG. 1C shows a variation in the light intensity of a plurality of successive pulses of the light source.

It is known that the emissivity of black-body and grey-body light sources varies over time, and may notably undergo a decrease. Use of a reference photodetector such as described above is therefore necessary to take into account this temporal variation. FIG. 1C shows a temporal variation in the intensity $I_{ref,k}$ of each light pulse, detected by a reference photodetector, at various times k, between a time k=0 and a time k=K, with K=2.6 $10^7$. The index k is a temporal index, and designates a pulse emitted at a measurement time k. The time interval separating two successive measurement times k and k+1 is, in this example, 1 s. This curve was obtained by measuring, with a reference photodetector, the variation in the intensity emitted by a light source in a time period of $2.6 \times 10^7$ seconds, i.e., 7220 hours, i.e., about 300 days. This measurement was carried out using the Heimann Sensor thermopile of reference HCM Cx2 Fx that played the role of reference photodetector $20_{ref}$.

Each pulse of the light source has a temporal form similar to that shown in FIG. 1B. Thus, during a pulse, the intensity of the pulse is variable and has a shape close to that of a top hat. The intensity of each pulse may be obtained by considering the maximum value or the mean value of such a pulse. In the present case, the intensity $I_{ref,k}$ corresponds to the mean value of the intensity of each pulse. The measurements shown in FIG. 1C were carried out using a pulse frequency of 1 Hz, the duration of each pulse being equal to 300 ms. It may be seen that the reference intensity gradually decreases, from an initial value $I_{ref,k=0}$ of about 101 mV to a final value $I_{ref,k=K}$ of about 72 mV. Substantial fluctuations in the measured reference intensity may also be observed. These fluctuations are essentially due to detection noise in the photodetector, in this case the thermopile. The intensities of the pulses are here expressed in units of voltage, corresponding to the voltage across the terminals of the thermopile.

Taking into account the reference intensity in equation (1), i.e., considering $I_{0,k}=I_{ref,k}$, the estimation $\hat{C}_{s,k}$ of the amount of the sought-after gaseous species is affected by the fluctuations in the measurement of the reference intensity $I_{ref,k}$. In other words, the fluctuations affecting the determination of the reference intensity $I_{ref,k}$ propagate to the estimation $\hat{C}_{s,k}$, this possibly leading to an uncertainty affecting the estimation of the amount of the sought-after gaseous species.

Figure 2A:
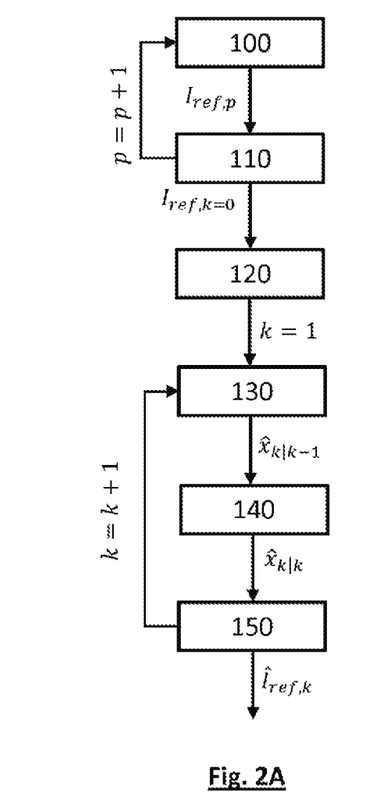
FIG. 2A illustrates the main steps of one embodiment of the disclosure.

The disclosure aims to attenuate the fluctuations affecting the determination of the reference intensity $I_{ref,k}$, and to take into account the gradual decrease in this intensity over time. To do this, it is based not on a measurement of the reference intensity $I_{ref,k}$, but rather on an estimation $\hat{I}_{ref,k}$ of the latter, based on an observation and on an iterative predictive model. The estimation $\hat{I}_{ref,k}$ may notably be obtained, at each time k, by implementing a recursive estimator. Such an estimator may, for example, be a Kalman filter, the main steps of which are illustrated in FIG. 2A and described below.

Step 100: initialization measurements. In this step, the light source 11 is activated and the intensity called the preliminary intensity, $I_{ref,p}$, of one or more pulses is measured using the reference photodetector $20_{ref}$. The index p designates the rank of the initialization iterations: it is comprised between 1 and P, P being a positive integer higher than or equal to 1. P is, for example, equal to 30.

Step 110: determining initialization values. In this step, an initialization measurement (step 100) is reiterated provided that p<P. When the iteration end condition is met (p=P), an initial reference light intensity $I_{ref,k=0}$ is determined from the various measured preliminary intensities $I_{ref,p}$. This determination may be carried out using a mean, according to the expression:

$$I_{ref,k=0} = \operatorname*{mean}_{p}(I_{ref,p}), \tag{2}$$

where mean is the mean operator.

An initial variance is also determined $$\operatorname{var}_{ref,k=0} = \operatorname*{var}_{p}(I_{ref,p}), \tag{3}$$

where var is the variance operator.

In this step, an initial state vector, $$x_{k=0} = \begin{pmatrix} I_{ref,k=0} \\ 0 \end{pmatrix},$$

is also determined.

Alternatively, the initial intensity $I_{ref,k=0}$ may be established arbitrarily or assigned a value determined during tests following manufacture of the source.

Step 120: taking into account a first measurement time (k=1) and starting the iterative method. Following the initialization phase, which encompasses steps 100 and 110, the iteration temporal index k, representing the iteration rank of the recursive method, it is initialised and given the value k=1.

At each time k, the reference light wave $12_{ref}$ may be represented by a state vector $$x_k = \begin{pmatrix} I_{ref,k} \\ d_k \end{pmatrix},$$

where:
$I_{ref,k}$ is the reference light intensity at the time k; and
$d_k$ is a drift in the reference light intensity at the time k. The drift $d_k$ corresponds to a comparison of the reference light intensity between two successive times k and k−1.

During the establishment of the initial state vector $\hat{x}_{k=0}$, the first term $I_{ref,k=0}$ of the vector corresponds to the initial intensity whereas the second term of the vector corresponds to an arbitrary value of the drift, this value, for example, being 0.

Two successive state vectors $x_{k-1}$, $x_k$ are related by the following state-evolution equations:

$$I_{ref,k}=I_{ref,k}+d_k+w_k^1 \tag{4}$$

$$d_k=d_{k-1}+w_k^2 \tag{5}$$

where $w_k^1$ and $w_k^2$ are noise terms described by normal distributions of zero mean and of variances equal to $\operatorname{var}(w_k^1)$ and $\operatorname{var}(w_k^2)$, respectively.

Each iteration aims to estimate a state vector $\hat{x}_k=\hat{x}_{k|k}$, representative of the reference light intensity at the time k, such that $$\hat{x}_k = \begin{pmatrix} \hat{I}_{ref,k} \\ \hat{d}_k \end{pmatrix}.$$

The symbol ^ designates an estimated quantity.

Step 130: estimating. From an estimation of the reference intensity $I_{ref,k-1}$ resulting from a preceding iteration k−1, estimating a reference intensity at the time k. In the first iteration (k=1), the estimation is based on the initial reference intensity $I_{ref,k=0}$ obtained in step 110. The estimation is obtained using the following estimation equation:

$$\hat{x}_{k|k-1}=A \cdot \hat{x}_{k-1|k-1} \tag{6}.$$

A is a prediction matrix, relating the state vector $\hat{x}_{k-1|k-1}$ resulting from the preceding iteration to the estimation of the state vector at the time k. In this example, the prediction matrix A is such that:

$$A = \begin{bmatrix} 1 & 1 \\ 0 & 1 \end{bmatrix}$$

This step also comprises estimating an error covariance matrix $\hat{P}_{k|k-1}$ using the expression:

$$\hat{P}_{k|k-1} = A \cdot P_{k-1} \cdot A^T + Q \quad (7)$$

$\hat{P}_k$ being a covariance matrix of the error estimated at the time k;
T being the transpose operator;
A being the prediction matrix described in conjunction with equation (6); and
Q being a noise covariance matrix of the process.
The noise covariance matrix Q of the process is such that:

$$Q = \begin{bmatrix} \mathrm{var}(w_k^1) & 0 \\ 0 & \mathrm{var}(w_k^2) \end{bmatrix}$$

with $\mathrm{var}(w_k^1) = \mathrm{var}(w_k^2) = 1 \times 10^{-5}$.

Step 140: Updating.

Figure 2B:
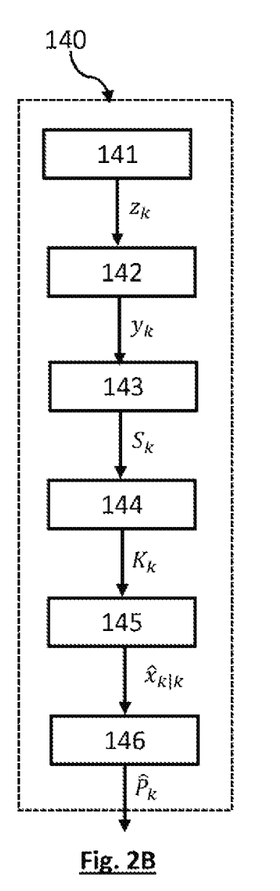
FIG. 2B shows the substeps of one step of FIG. 2A.

The updating step comprises the following substeps, which are described with reference to FIG. 2B:

Substep 141: observing. A measurement is taken of the reference intensity $I_{ref,k}$ at the time k, from which measurement a quantity $z_k$, called the observation quantity is determined, this quantity being such that:

$$z_k = I_{ref,k} + v_k \quad (8),$$

where $v_k$ is a noise term, described by a normal distribution of zero mean and variance equal to $\mathrm{var}_{ref,k=0}$, as defined with reference to equation (3).

Substep 142: determining an innovation $y_k$ using the following expression:

$$y_k = z_k - C \cdot \hat{x}_{k|k-1} \quad (9)$$

with C=[1 0]·$\hat{x}_{k|k-1}$ results from step 130.

Substep 143: determining a covariance $S_k$ of the innovation with:

$$S_k = C \cdot \hat{P}_{k|k-1} \cdot C^T + R \quad (10),$$

R being equal to the variance determined in the initialization phase using equation (3).

Substep 144: calculating the gain $K_k$:

$$K_k = \hat{P}_{k|k-1} \cdot C^T \cdot S_k^{-1} \quad (11)$$

Substep 145: updating the state vector:

$$\hat{x}_k = \hat{x}_{k|k} = \hat{x}_{k|k-1} + K_k \cdot y_k \quad (12)$$

Substep 146: updating the error covariance matrix:

$$\hat{P}_k = (I - K_k \cdot C) \cdot \hat{P}_{k|k-1} \quad (13).$$

I is an identity matrix of (2, 2) size.

Step 150: reiterating: The iteration temporal index k is incremented and the iterative process starts again from step 130, on the basis of the estimations $\hat{x}_{k|k}$ and $\hat{P}_k$ obtained in substeps 145 and 146, respectively.

Figure 3A:
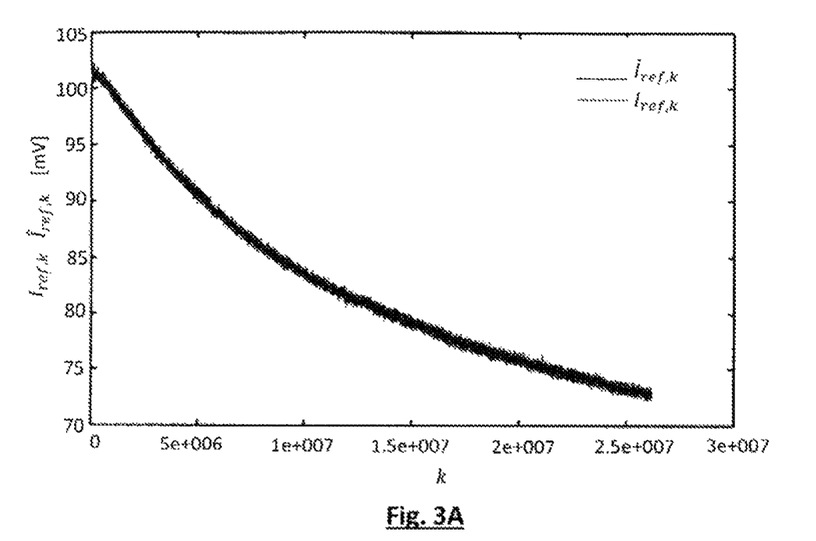
FIG. 3A shows the result of an experimental trial, comparing, at various successive times, the measurement of an intensity of a reference light wave and its estimation by the method of the disclosure.
Figure 3B:
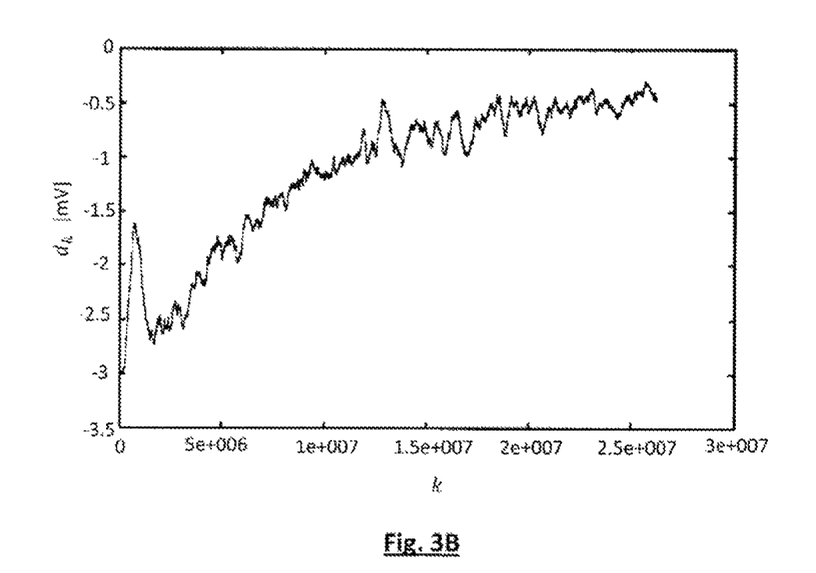
FIG. 3B illustrates an estimation of the drift in the reference light intensity during the experimental trial.

Each estimation $\hat{x}_{k|k}$ of the state vector makes it possible to obtain an estimation $\hat{I}_{ref,k}$ of the intensity of the reference light wave and an estimation $\hat{d}_k$ of the drift at each measurement time k. FIGS. 3A and 3B show the estimations $\hat{I}_{ref,k}$ and $\hat{d}_k$ obtained based on the variation in the intensity of the reference light wave $12_{ref}$ shown in FIG. 1C, respectively. It may be seen that the estimations $\hat{I}_{ref,k}$ are clearly less affected by the noise measured by taking a measurement of $I_{ref,k}$. Specifically, the curve showing the temporal variation in the estimation $\hat{I}_{ref,k}$ is clearly less subject to temporal fluctuations than the measurements $I_{ref,k}$. This is due to the fact that the Kalman filter takes into account the variance of the noise of the reference photodetector, the variance notably being "learnt" during the initialization period, using the preliminary measurements. The method thus allows the intensity of the reference light wave to be estimated while limiting, or even completely removing, the fluctuations caused by the reference photodetector $20_{ref}$. This estimation allows the temporal variation in the reference intensity, due to the decrease in the emissivity of the light source 11, to be taken into account. This makes it possible to obtain an estimation of the amount $\hat{C}_{s,k}$ of gaseous species that is less subject to the fluctuations of the reference photodetector $20_{ref}$, while taking into account the variation in the emissivity of the light source 11.

Figure 3C:
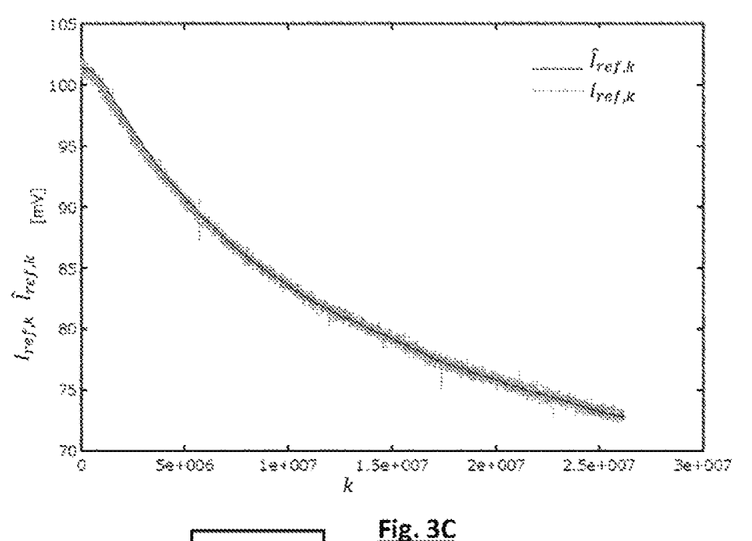
FIG. 3C shows another result of an experimental trial, comparing, at various successive times, the measurement of an intensity of a reference light wave and its estimation by the method of the disclosure. This result was obtained using a measurement acquisition frequency lower than the frequency that allowed the data shown in FIG. 3A to be obtained.

FIG. 3C shows the results of another simulation, in which the acquisition frequency was sub-sampled by a factor of 1000 with respect to the simulation shown in FIG. 3A. The temporal variation in the measurements $I_{ref,k}$ is again subject to substantial fluctuations, whereas the temporal variation in the estimation $\hat{I}_{ref,k}$ is clearly less noisy.

Figure 4:
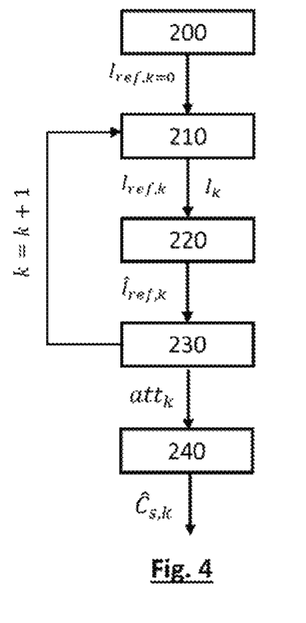
FIG. 4 illustrates the main steps of a method for estimating a light attenuation, with a view to estimating an amount of gaseous species in a sample.

With reference to FIG. 4, the main steps of a method for estimating the attenuation of an incident light wave produced by a light source will now be described, with reference to the application illustrated in FIG. 1A. In a first step 200 of initialization, initialization data are obtained. This step encompasses the initialization phase described above (steps 100 and 110). Following this initialization phase, the method comprises the following steps:

Step 210: activating the light source 11 at a time k and measuring the intensity $I_k$ of the light wave 14 transmitted by the gas present in the sample, using the measurement photodetector 20. Simultaneously, the reference light wave $12_{ref}$ is measured using the reference photodetector $20_{ref}$, this allowing a measurement of the reference intensity $I_{ref,k}$ to be obtained.

Step 220: based on the reference light wave $I_{ref,k}$ measured at the time k, an iteration of the recursive estimating method described with reference to steps 130 to 150 is implemented. This notably allows an estimation $\hat{I}_{ref,k}$ of the reference intensity at the time k to be obtained. This estimation is calculated by the first processor 30, which is, for example, a microcontroller.

Step 230: comparing the reference intensity $\hat{I}_{ref,k}$ estimated in step 220 with the intensity $I_k$ measured in step 210 in order to obtain an attenuation $\mathrm{att}_k$ of the incident light wave 12 by the sample. This comparison may be carried out by the second processor 30', which is, for example, a microprocessor connected to the first processor 30.

The method may comprise a step 240 of determining an amount $\hat{C}_{s,k}$ of a gaseous species $G_s$ based on the attenuation $\mathrm{att}_k$ obtained at the end of step 230, as described above with reference to equation (1).

Steps 210 to 230, or even 240, may be reiterated at various measurement times k.

The disclosure is not limited to the estimation of a light intensity emitted by a light source, and may be applied to other types of wave-emitting sources. It may, for example, be a question of a source of ionizing electromagnetic radiation, for example, an x-ray source, or a source of an acoustic wave, a piezoelectric transducer, for example. The targeted applications thus encompass nondestructive-testing and medical-imaging applications. The disclosure is notably applicable when it is desired to achieve an estimation of a reference intensity emitted by an emitting source, this reference intensity corresponding to a wave emitted by the emitting source and that propagates toward a sample to be examined. The advantage is that fluctuations due to the detection, by a sensor, of the reference wave are avoided. It is then possible to compare an intensity of a wave having interacted with the sample, by reflection, transmission, scattering, or refraction, with the reference wave estimated by implementing the disclosure. The comparison allows the sample to be analyzed, and, for example, of an amount of scattering elements to be determined.

When the emitting source is a light wave, the advantage of the disclosure is to allow an estimation that is not affected by noise of the intensity of a light wave incident on the examined sample. The examined sample may interact with the incident light wave by absorbing it partially, as described in the detailed example, or even by scattering it or diffracting it. The comparison between the intensity of the reference wave and the intensity of the scattered, absorbed or refracted wave, allows a property of the object to be estimated, and, in particular, a content of a particular species or a refractive index.

The invention claimed is:

1. A method for analyzing a gas sample, by comparison between a light wave incident on the sample and a light wave transmitted by the sample, the method comprising:
   i) illuminating the sample, with a light source, the light source emitting an incident light wave that propagates to the sample;
   ii) detecting, with a measurement photodetector, a transmitted light wave transmitted by the sample, the transmitted light wave resulting from an attenuation of the incident light wave by the sample;
   iii) detecting a reference light wave with a reference photodetector, the reference light wave being emitted by the light source, the reference light wave being representative of a light wave reaching the reference photodetector without interaction with the sample;
   iv) reiterating i) to iii) at various measurement times;
   v) from each reference light wave detected in each step iii), at each measurement time, estimating an intensity of the reference light wave at the measurement times, by implementing:
      b) estimating an intensity of the reference light wave at a measurement time based on an initial intensity or an estimation of the intensity of the reference light wave at a prior measurement time;
      c) measuring an intensity of the reference light wave detected at the measurement time;
      d) updating the estimation of the intensity of the reference light wave at the measurement time, depending on the intensity measured in c) and the intensity estimated in b); and
      e) reiterating b) to d), on the basis of the estimation of the intensity of the reference light wave obtained in d), while incrementing the measurement time;
   vi) taking into account the intensity of the reference light wave estimated, at each measurement time, including the estimated intensity resulting from v), and an intensity of the transmitted light wave detected in ii) and performing a comparison, at each measurement time, based on the reference light wave and on the transmitted light wave transmitted by the sample; and
   vii) analyzing the gas sample depending on the comparison performed in vi).

2. The method of claim 1, wherein v) further comprises:
   a) determining an initial intensity of the reference light wave.

3. The method of claim 2, wherein a) further comprises detecting, with the reference photodetector, the reference light wave during an initialization period.

4. The method of claim 3, wherein a) comprises:
   ai) detecting the reference light wave at a plurality of preliminary times, during the initialization period, and measuring an intensity of the reference light wave detected at each preliminary time; and
   aii) determining the initial intensity from a mean or a median of the intensities measured in ai).

5. The method of claim 1, wherein b) further comprises estimating a state vector, at each measurement time, the state vector comprising an estimation of the intensity of the reference light wave detected at the measurement time.

6. The method of claim 5, wherein the state vector also comprises a term representing an estimation of a drift in the intensity of the reference light wave between two successive measurement times.

7. The method of claim 5, wherein b) comprises estimating the state vector at each measurement time, by applying a prediction matrix to the state vector determined at a time preceding the measurement time.

8. The method of claim 5, wherein d) comprises:
   di) performing a comparison between the measurement of the reference intensity carried out in c) preceding d), and the estimation resulting from b) preceding d); and
   dii) updating the state vector depending on the comparison resulting from di).

9. The method of claim 5, wherein b) to d) are implemented using a recursive estimator of a Kalman-filter type.

10. The method of claim 1, wherein the incident light wave being attenuated by the sample, the method further comprises, in vi), calculating a ratio of the estimated intensity of the reference light wave and the intensity of the transmitted light wave, the ratio corresponding to the attenuation of the incident light wave by the sample.

11. The method of claim 1, wherein the sample comprises a gaseous species that attenuates the incident light wave, the method further comprising, in vii), estimating an amount of the gaseous species in the sample, at each measurement time, from the attenuation determined in vi) at the measurement time.

12. A device for analyzing a gas sample, the device comprising
   a light source configured to emit an incident light wave that propagates toward the sample;
   a measurement photodetector, configured to detect a light wave transmitted by the sample, at various measurement times, the transmitted light wave resulting from an interaction of the incident light wave with the sample;
   a reference photodetector, configured to detect a reference light wave emitted by the light source, at various measurement times, the reference light wave being representative of a light wave reaching the reference photodetector without interaction with the sample;
   a first processor, configured to estimate an intensity of the reference light wave at the various measurement times, from the reference light wave detected by the reference photodetector at each measurement time, the first processor being configured to implement v) of the method of claim 1; and a second processor configured to compare, at each measurement time, the reference light wave and the light wave transmitted by the sample, at the measurement time, from the intensity of the reference light wave estimated by the first processor at each measurement time, and from an intensity of the transmitted light wave detected by the measurement photodetector, the second processor being programmed to implement vi) of the method of claim 1.

13. The device of claim 12, wherein the first processor and the second processor are one and the same.

* * * * *

UNITED STATES PATENT AND TRADEMARK OFFICE
CERTIFICATE OF CORRECTION

PATENT NO. : 10,788,417 B2
APPLICATION NO. : 16/485744
DATED : September 29, 2020
INVENTOR(S) : Thanh Trung Le It is certified that error appears in the above-identified patent and that said Letters Patent is hereby corrected as shown below:

In the Specification

| | | |
|---|---|---|
| Column 3, | Line 2, | change "following sub steps:" to --following substeps:-- |
| Column 3, | Line 38, | change "Sub step a)" to --Substep a)-- |
| Column 3, | Line 48, | change "Sub step b)" to --Substep b)-- |
| Column 3, | Line 61, | change "in sub step c)" to --in substep c)-- |
| Column 3, | Line 66, | change "Sub steps b)" to --Substeps b)-- |
| Column 5, | Line 42, | change "species $G_S$ for" to --species $G_s$ for-- |
| Column 5, | Line 43, | change "amount $C_{s,k}$ in" to --amount $C_{s,k}$ in-- |
| Column 5, | Lines 43-44, | change "time k. The intensity $I_k$" to --time $k$. The intensity $I_k$-- |
| Column 5, | Line 45, | change "time k depends" to --time $k$ depends-- |
| Column 5, | Line 46, | change "amount $C_{s,k}$, according" to --amount $C_{s,k}$, according-- |
| Column 5, | Line 54, | change "$\mu(C_{s,k})$ is an" to --$\mu(\ C_{s,k})$ is an-- |
| Column 5, | Line 55, | change "amount $C_{s,k}$;" to --amount $C_{s,k}$;-- |
| Column 5, | Line 56, | change "l is the" to --$l$ is the-- |
| Column 5, | Line 58, | change "I$_{0,k}$ is the" to --$I_{0,k}$ is the-- |
| Column 5, | Line 59, | change "time k." to --time $k$.-- |
| Column 5, | Line 60, | change "I$_k$ and I$_{O,k}$," to --$I_k$ and $I_{0,k}$,-- |
| Column 6, | Line 1, | change "attenuation att$_k$ of" to --attenuation $att_k$ of-- |
| Column 6, | Line 2, | change "time k." to --time $k$.-- |
| Column 6, | Line 4, | change "$\mu(C_{s,k})$, this allowing $C_{s,k}$" to --$\mu(\ C_{s,k})$, this allowing $\hat{C}_{s,k}$-- |
| Column 6, | Line 5, | change "$C_{s,k}$ and $\mu(C_{s,k})$" to --$C_{s,k}$ and $\mu(\ C_{s,k})$-- |
| Column 6, | Line 6, | change "intensity I$_{O,k}$ of" to --intensity $I_{0,k}$ of-- |
| Column 6, | Line 7, | change "measurement time k." to --measurement time $k$.-- |

Signed and Sealed this
First Day of December, 2020

Andrei Iancu
*Director of the United States Patent and Trademark Office*

CERTIFICATE OF CORRECTION (continued)

U.S. Pat. No. 10,788,417 B2

| | | |
|---|---|---|
| Column 6, | Line 15, | change "measurement time k," to --measurement time $k$,-- |
| Column 6, | Line 16, | change "intensity $I_{ref,k}$." to --intensity $I_{ref,k}$.-- |
| Column 6, | Line 34, | change "measurement of $I_{ref,k}$" to --measurement of $I_{ref,k}$-- |
| Column 6, | Line 35, | change "$I_{O,k}$ replaced by $I_{ref,k}$," to --$I_{0,k}$ replaced by $I_{ref,k}$,-- |
| Column 6, | Line 36, | change "$\mu(C_{s,k})$ to be determined, then $\hat{C}_{s,k}$" to --$\mu(C_{s,k})$ to be determined, then $\hat{C}_{s,k}$-- |
| Column 6, | Line 39, | change "intensity $I_{ref,k}$ of" to --intensity $I_{ref,k}$ of-- |
| Column 6, | Line 41, | change "measurement time k," to --measurement time $k$,-- |
| Column 6, | Line 48, | change "intensity $I_k$ of" to --intensity $I_k$ of-- |
| Column 6, | Line 53, | change "attenuation $att_k$ of" to --attenuation $att_k$ of-- |
| Column 6, | Line 61, | change "intensity $I_{ref,k}$ of" to --intensity $I_{ref,k}$ of-- |
| Column 6, | Line 62, | change "various times k," to --various times $k$,-- |
| Column 6, | Line 63, | change "k=0 and a time k=K, with K=2.6 $10^7$. The index k" to --$k = 0$ and a time $k = K$, with $K = 2.6\ 10^7$. The index $k$-- |
| Column 6, | Line 65, | change "measurement time k." to --measurement time $k$.-- |
| Column 6, | Line 66, | change "measurement time k and k+1" to --measurement time $k$ and $k+1$-- |
| Column 7, | Line 11, | change "intensity $I_{ref,k}$" to --intensity $I_{ref,k}$-- |
| Column 7, | Line 16, | change "value $I_{ref,k=0}$ of" to --value $I_{ref,k=0}$ of-- |
| Column 7, | Line 17, | change "value $I_{ref,k=K}$ of" to --value $I_{ref,k=K}$ of-- |
| Column 7, | Line 26, | change "$I_{o,k}= I_{ref,k}$, the estimation $\hat{C}_{s,k}$" to --$I_{0,k} = I_{ref,k}$, the estimation $\hat{C}_{s,k}$-- |
| Column 7, | Lines 28-29, | change "intensity $I_{ref,k}$." to --intensity $I_{ref,k}$.-- |
| Column 7, | Line 30, | change "intensity $I_{ref,k}$ propagate" to --intensity $I_{ref,k}$ propagate-- |
| Column 7, | Line 31, | change "estimation $\hat{C}_{s,k}$, this" to --estimation $\hat{C}_{s,k}$, this-- |
| Column 7, | Line 35, | change "intensity $I_{ref,k}$, and" to --intensity $I_{ref,k}$, and-- |
| Column 7, | Line 39, | change "intensity $I_{ref,k}$, but rather on an estimation $\hat{I}_{ref,k}$" to --intensity $I_{ref,k}$, but rather on an estimation $\hat{I}_{ref,k}$-- |
| Column 7, | Line 41, | change "The estimation $\hat{I}_{ref,k}$" to --The estimation $\hat{I}_{ref,k}$-- |
| Column 7, | Line 42, | change "time k, by" to --time $k$, by-- |
| Column 7, | Line 48, | change "intensity $I_{ref,p}$, of" to --intensity $I_{ref,p}$, of-- |
| Column 7, | Line 49, | change "The index p" to --The index $p$-- |
| Column 7, | Line 51, | change "between 1 and P, P" to --between 1 and $P$, $P$-- |
| Column 7, | Line 52, | change "P is, for" to --$P$ is, for-- |
| Column 7, | Line 55, | change "the p<P. When" to --that $p < P$. When-- |

CERTIFICATE OF CORRECTION (continued)

U.S. Pat. No. 10,788,417 B2

| | | |
|---|---|---|
| Column 7, | Line 55, | change "met (p=P), an" to --met ($p = P$), an-- |
| Column 7, | Line 56, | change "intensity $I_{ref,k=0}$ is" to --intensity $I_{ref,k=0}$ is-- |
| Column 7, | Line 57, | change "intensities $I_{ref,p}$." to --intensities $I_{ref,p}$.-- |
| Column 7, | Line 63, | change "$I_{ref,k=0} = \text{mean}_p(I_{ref,p})$," to --$I_{ref,k=0} = \text{mean}_p(I_{ref,p})$-- |
| Column 7, | Line 65, | change "where mean is" to --where *mean* is-- |
| Column 8, | Line 2, | change "$\text{var}_{ref,k=0} = \text{var}_p(I_{ref,p})$," to --$var_{ref,k=0} = var_p(I_{ref,p})$-- |
| Column 8, | Line 5, | change "where var is" to --where *var* is-- |
| Column 8, | Line 14, | change "intensity $I_{ref,k=0}$ may" to --$I_{ref,k=0}$ may-- |
| Column 8, | Line 18, | change "(k=1) and starting" to --($k = 1$) and starting-- |
| Column 8, | Line 20, | change "index k, representing" to --index $k$ representing-- |
| Column 8, | Lines 21-22, | change "value k=1." to --value $k = 1$.-- |
| Column 8, | Line 23, | change "time k, the" to --time $k$, the-- |
| Column 8, | Line 32, | change "$I_{ref,k}$ is the" to --$I_{ref,k}$ is the-- |
| Column 8, | Lines 32-33, | change "time k; and $d_k$ is" to --time $k$; and $d_k$ is-- |
| Column 8, | Lines 33-34, | change "time k. The drift $d_k$" to --time $k$. The drift $d_k$-- |
| Column 8, | Lines 35-36, | change "times k and k-1." to --times $k$ and $k - 1$.-- |
| Column 8, | Lines 37-38, | change "vector $\hat{x}_{k=0}$, the first term $I_{ref,k=0}$" to --vector $\hat{x}_{k=0}$, the first term $I_{ref,k=0}$-- |
| Column 8, | Line 42, | change "vectors $x_{k-1}$, $x_k$ are" to --vectors $x_{k-1}$, $x_k$ are-- |
| Column 8, | Line 47, | change "where $w_k^1$ and $w_k^2$" to --where $w_k^1$ and $w_k^2$-- |
| Column 8, | Lines 48-49, | change "to var($w_k^1$) and var($w_k^2$)," to --to $var(w_k^1)$ and $var(w_k^2)$,-- |
| Column 8, | Line 50, | change "vector $\hat{x}_k = \hat{x}_{k|k}$," to --vector $\hat{x}_k = \hat{x}_{k|k}$,-- |
| Column 8, | Line 51, | change "the time k," to --the time $k$,-- |
| Column 8, | Line 62, | change "intensity $I_{ref,k-1}$ resulting" to --intensity $I_{ref,k-1}$ resulting-- |
| Column 8, | Line 62, | change "iteration k-1," to --iteration $k - 1$,-- |
| Column 8, | Line 63, | change "the time k." to --the time $k$.-- |
| Column 8, | Line 64, | change "iteration (k=1), the" to --iteration ($k = 1$), the-- |
| Column 8, | Line 65, | change "intensity $I_{ref,k=0}$ obtained" to --intensity $I_{ref,k=0}$ obtained-- |
| Column 9, | Line 1, | change "A is a" to --*A* is a-- |
| Column 9, | Line 1, | change "vector $\hat{x}_{k-1|k-1}$ resulting" to --vector $\hat{x}_{k-1|k-1}$ resulting-- |
| Column 9, | Line 3, | change "the time k." to --the time $k$.-- |
| Column 9, | Line 4, | change "matrix A is" to --matrix *A* is-- |

CERTIFICATE OF CORRECTION (continued)

U.S. Pat. No. 10,788,417 B2

| Column 9, | Line 11, | change "matrix $\hat{P}_{k|k-1}$ using" to --matrix $\hat{P}_{k|k-1}$ using-- |
| Column 9, | Line 14, | change "$\hat{P}_k$ being a" to --$\hat{P}_k$ being a-- |
| Column 9, | Line 15, | change "the time k;" to --the time $k$;-- |
| Column 9, | Line 16, | change "T being the" to --$T$ being the-- |
| Column 9, | Line 17, | change "A being the" to --$A$ being the-- |
| Column 9, | Line 19, | change "Q being a" to --$Q$ being a-- |
| Column 9, | Line 20, | change "matrix Q of" to --matrix $Q$ of-- |
| Column 9, | Line 29, | change "var($w_k^1$)=var($w_k^2$)=1×10$^{-5}$." to --$var(w_k^1) = var(w_k^2) = 1 \times 10^{-5}$.-- |
| Column 9, | Line 32, | change "$I_{ref,k}$ at the time k," to --$I_{ref,k}$ at the time $k$,-- |
| Column 9, | Line 33, | change "quantity z$_k$, called" to --quantity $z_k$, called-- |
| Column 9, | Line 37, | change "where v$_k$ is" to --where $v_k$ is-- |
| Column 9, | Line 38, | change "to var$_{ref,k=0}$, as" to --to $var_{ref,k=0}$, as-- |
| Column 9, | Line 40, | change "innovation y$_k$ using" to --innovation $y_k$ using-- |
| Column 9, | Line 44, | change "with C=[1 0]· $\hat{x}_{k|k-1}$ results" to --with $C = [1\ 0]$. $\hat{x}_{k|k-1}$ results-- |
| Column 9, | Line 45, | change "covariance S$_k$ of" to --covariance $S_k$ of-- |
| Column 9, | Line 49, | change "R being equal" to --$R$ being equal-- |
| Column 9, | Line 51, | change "the gain K$_k$:" to --the gain $K_k$:-- |
| Column 9, | Line 60, | change "I is an" to --$I$ is an-- |
| Column 9, | Line 61, | change "index k is" to --index $k$ is-- |
| Column 9, | Line 63, | change "$\hat{x}_{k|k}$ and $\hat{P}_k$ obtained" to --$\hat{x}_{k|k}$ and $\hat{P}_k$ obtained-- |
| Column 9, | Line 65, | change "estimation $\hat{x}_{k|k}$ of" to --estimation $\hat{x}_{k|k}$ of-- |
| Column 9, | Line 66, | change "estimation $\hat{I}_{ref,k}$ of" to --estimation $\hat{I}_{ref,k}$ of-- |
| Column 9, | Line 67, | change "estimation $\hat{d}_k$ of" to --estimation $\hat{d}_k$ of-- |
| Column 10, | Line 1, | change "time k." to --time $k$.-- |
| Column 10, | Lines 1-2, | change "$\hat{I}_{ref,k}$ and $\hat{d}_k$ obtained" to --$\hat{I}_{ref,k}$ and $\hat{d}_k$ obtained-- |
| Column 10, | Line 4, | change "estimations $\hat{I}_{ref,k}$ are" to --estimations $\hat{I}_{ref,k}$ are-- |
| Column 10, | Line 5, | change "measurement of $I_{ref,k}$." to --measurement of $I_{ref,k}$.-- |
| Column 10, | Line 7, | change "estimation $\hat{I}_{ref,k}$ is" to --estimation $\hat{I}_{ref,k}$ is-- |
| Column 10, | Line 8, | change "measurements $I_{ref,k}$." to --measurements $I_{ref,k}$.-- |
| Column 10, | Line 19, | change "amount $\hat{C}_{s,k}$ of" to --amount $\hat{C}_{s,k}$ of-- |
| Column 10, | Line 26, | change "measurements $I_{ref,k}$ is" to --measurements $I_{ref,k}$ is-- |
| Column 10, | Line 28, | change "estimation $\hat{I}_{ref,k}$ is" to --estimation $\hat{I}_{ref,k}$ is-- |
| Column 10, | Line 37, | change "a time k" to --a time $k$-- |
| Column 10, | Line 38, | change "intensity I$_k$ of" to --intensity $I_k$ of-- |

CERTIFICATE OF CORRECTION (continued)
U.S. Pat. No. 10,788,417 B2

|  | Column 10, | Line 42, | change "intensity $I_{ref,k}$ to" to --intensity $I_{ref,k}$ to-- |
|---|---|---|---|
|  | Column 10, | Line 44, | change "wave $I_{ref,k}$ measured" to --wave $I_{ref,k}$ measured-- |
|  | Column 10, | Line 45, | change "the time k," to --the time $k$,-- |
|  | Column 10, | Line 47, | change "estimation $\hat{I}_{ref,k}$ of" to --estimation $\hat{I}_{ref,k}$ of-- |
|  | Column 10, | Line 48, | change "the time k" to --the time $k$-- |
|  | Column 10, | Line 51, | change "intensity $\hat{I}_{ref,k}$ estimated" to --intensity $\hat{I}_{ref,k}$ estimated-- |
|  | Column 10, | Line 52, | change "intensity $I_k$ measured" to --intensity $I_k$ measured-- |
|  | Column 10, | Line 53, | change "attenuation $att_k$ of" to --attenuation $att_k$ of-- |
|  | Column 10, | Line 58, | change "$\hat{C}_{s,k}$ or a gaseous species $G_s$" to --$\hat{C}_{s,k}$ of a gaseous species $G_s$-- |
|  | Column 10, | Line 59, | change "attenuation $att_k$ obtained" to --attenuation $att_k$ obtained-- |
|  | Column 10, | Line 62, | change "measurement times k." to --measurement times $k$.-- |

In the Claims
| Claim 1, | Column 11, | Line 49, | change "time based on" to --time, based on-- |
|---|---|---|---|
| Claim 12, | Column 12, | Line 49, | change "device comprising" to --device comprising:-- |